United States Patent [19]

Barnie et al.

[11] Patent Number: 4,507,788
[45] Date of Patent: Mar. 26, 1985

[54] MULTIPLE PULSE TEA LASER

[75] Inventors: James W. Barnie, Stoughton; Robert I. Rudko, Holliston, both of Mass.

[73] Assignee: Raytheon Company, Lexington, Mass.

[21] Appl. No.: 594,435

[22] Filed: Mar. 29, 1984

Related U.S. Application Data

[63] Continuation of Ser. No. 317,674, Nov. 2, 1981, abandoned.

[51] Int. Cl.$^3$ .............................................. H01S 3/097
[52] U.S. Cl. ...................................... 372/83; 372/86; 372/93; 372/103
[58] Field of Search ........................ 372/38, 83, 84, 86, 372/87, 93, 97, 19, 81

[56] References Cited

U.S. PATENT DOCUMENTS

| | | | |
|---|---|---|---|
| 3,842,367 | 10/1974 | Schlossberg | 331/94.5 |
| 3,848,203 | 11/1974 | Hale et al. | 331/94.5 |
| 3,856,402 | 12/1974 | Low et al. | 356/5 |
| 3,979,694 | 9/1976 | Goldhar et al. | 331/94.5 M |
| 4,019,157 | 4/1977 | Hutchinson et al. | 331/94.5 C |
| 4,093,927 | 6/1978 | Levine | 372/84 |
| 4,351,052 | 9/1982 | Sasaki et al. | 372/58 |

FOREIGN PATENT DOCUMENTS

| | | |
|---|---|---|
| 0011679A2 | 8/1979 | European Pat. Off. |
| WO81/02952 | 10/1981 | PCT Int'l Appl. |
| 1082961 | 9/1967 | United Kingdom |
| 1272726 | 5/1972 | United Kingdom |
| 1289745 | 9/1972 | United Kingdom |
| 1306746 | 2/1973 | United Kingdom |
| 1361530 | 7/1974 | United Kingdom |
| 1390309 | 4/1976 | United Kingdom |
| 2027980A | 2/1980 | United Kingdom |
| 2035674A | 6/1980 | United Kingdom |
| 2058443A | 4/1981 | United Kingdom |

OTHER PUBLICATIONS

Lachambre et al., "Frequency and Amplitude Characteristics of a High Repetition Rate Hybrid TEA-$CO_2$ Laser", IEEE JQE, vol. QE-14, No. 3, Mar. 1978, pp. 170–177.

Rudko, "Temporal Coherence Measurements of a Double Discharge $CO_2$ TEA Laser", Proceedings of the IEEE Conference on Laser Engineering Applications, May 1975, p. 54.

Gondhalekar et al., "Single Longitudinal Mode Operation of High Pressure Pulsed $CO_2$ Lasers," Applied Physics Letters, vol. 46A, No. 3, Dec. 17, 1973, at p. 229.

Meyer, "Single Mode $CO_2$ Laser Pulses of High Power," Applied Physics Letters, vol. 58A, No. 3, Aug. 23, 1976, p. 167.

Lachambre et al., "Injection Locking and Mode Selection in TEA-$CO_2$ Laser Oscillators," Journal of Quantum Electronics, vol. QE-12, No. 12, Dec. 1976 at p. 756.

Reid et al., "Laser Power and Gain Measurements on the Sequence Bands of $CO_2$", Journal of Applied Physics, vol. 48, No. 7, Jul. 1977, p. 2712.

Lachambre et al., "Simultaneous Frequency Stabilization and Injection of a TEA-$CO_2$ Oscillator," Applied Optics, vol. 17, No. 7, Apr. 1, 1978, at p. 1015.

Primary Examiner—James W. Davie
Attorney, Agent, or Firm—Richard M. Sharkansky; Joseph D. Pannone

[57] ABSTRACT

A laser system capable of producing multiple pulses comprising a single optical resonator having multiple discharge regions and multiple sets of electrodes and preionizers. The optical resonator is folded and the beam passes through all of the discharge regions. Since the multiple discharges occur within the same resonator, multiple identical pulses are produced and since the discharge regions are separated, the shock wave and medium inhomogeneity produced by a discharge in one discharge region will not disturb the others. The overall mirror separation and electrode spacing define a Fresnel number suited for single transverse mode operation.

18 Claims, 1 Drawing Figure

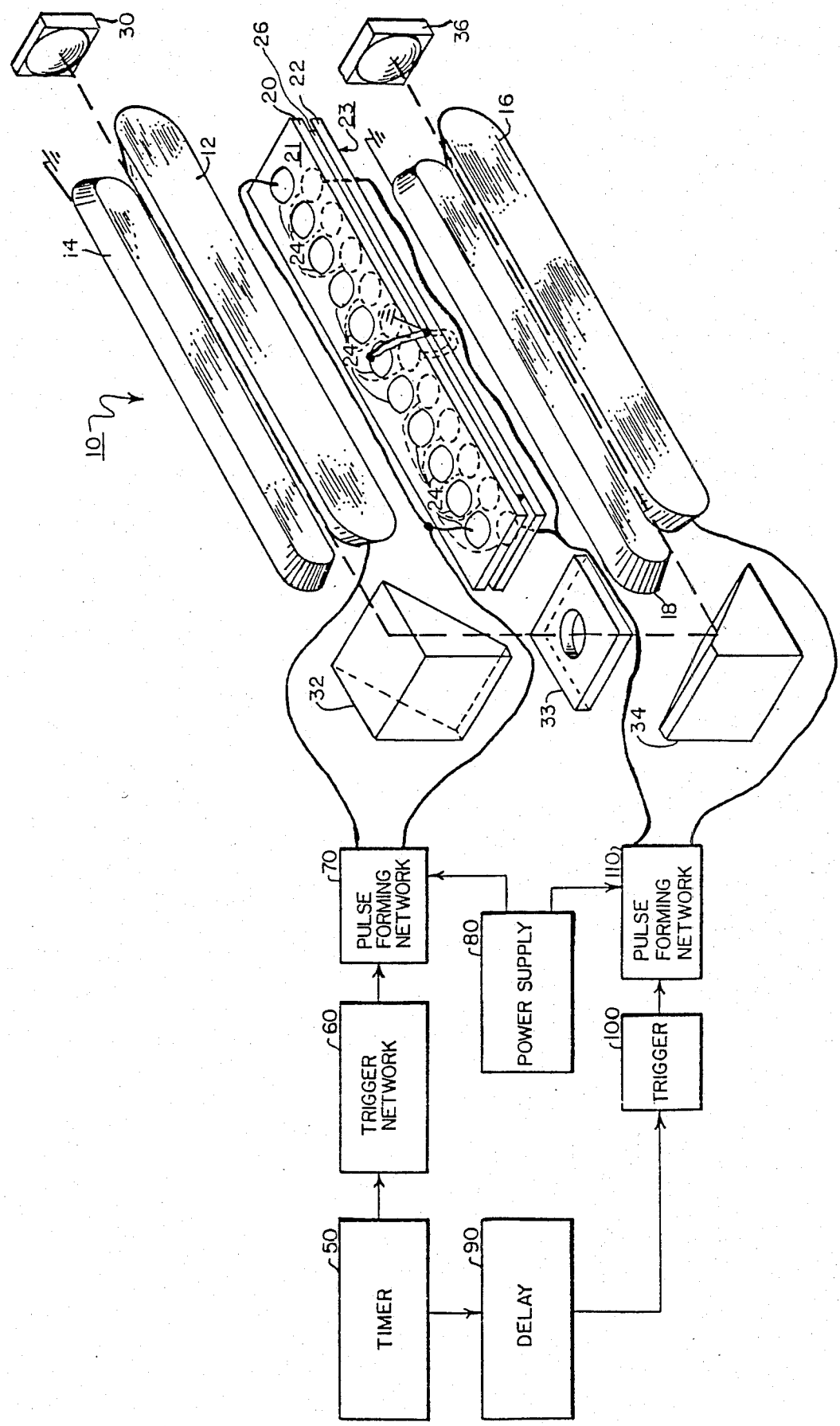

MULTIPLE PULSE TEA LASER

This application is a continuation of application Ser. No. 317,674, filed Nov. 2, 1981, abandoned.

BACKGROUND OF THE INVENTION

This invention relates to laser systems capable of multiple pulse operation.

There is a need for a laser system which can produce multiple pulses having a controllable separation between pulses. For instance, such a system is useful in systems performing averaged cross-wind velocity measurements by using a correlation technique, and in incoherent designator systems.

One technique that may be used is to employ two separate lasers pulsing consecutively. The multiple pulses are then transmitted along the same optical axis. The problem is that the mode from the different lasers are not exactly the same, thus causing problems in applications requiring correlation between the pulses. Additionally, it is extremely difficult to maintain the required alignment stability between the two lasers. Another technique which may be used consists of pulsing a standard laser at the required interval to produce the multiple pulses. A problem with this is that it requires a power supply with a high enough current capability to recharge the energy storage capacitors in less than the minimum interval required. Another problem is that when the laser is pulsed with a short interval between pulses, as required in certain applications, the shock waves and the medium inhomogeneities produced by a first discharge do not substantially dissipate, prior to subsequent discharge, thus creating problems by interfering with the subsequent discharge.

SUMMARY OF THE INVENTION

These and other problems are solved by the present invention which provides for a laser system capable of producing multiple pulses without the problems encountered with presently known techniques. This is achieved by using multiple discharge regions within a common resonator. The advantage of this system is that the overall mirror separation and the electrode spacing define a Fresnel number which is almost ideal for single transverse mode operation. By folding the resonator, as in the present invention, a more compact structure is achieved. Additionally, since the separate discharge regions can have their own pulse forming network and trigger circuit, the multiple discharges can be fired simultaneously for maximum output, or they can be fired sequentially separated by a delay for producing multiple discharge output that is useful in the applications mentioned herein. Another advantage of this system is that since the discharge regions are inside the same resonator, the multiple pulses generate an identical output beam. Additionally, in the folded resonator design of the present invention, the multiple discharges are separate and isolated from each other, thus the discharge in a first region will not disturb the medium in a second region.

This invention further provides for means for providing a plurality of discharge regions in a single optical resonator, a gain medium disposed in said discharge regions, and means for producing a discharge in each of said regions, said discharges being produced in a predetermined time relationship.

Additionally, the invention discloses means for providing a plurality of separate but optically coupled discharge regions including a gain medium and forming a single optical resonator, and means for selectively producing a discharge in said discharge regions. In one application, said discharges may be produced simultaneously, while in another application, said discharges are produced successively and are separated by a predetermined time interval. Preferably, said discharges are separated by a time interval greater than the duration of turbulence generated in the resonator by a prior discharge.

The present invention also provides for an optical resonator, a plurality of discharge regions disposed within said resonator and having a gain medium therein, means for independently producing a discharge in each of said discharge regions, and means for controlling said discharge producing means to establish a predetermined timing between discharges from different ones of said discharge regions. Preferably, each of said discharge regions comprises a different predetermined portion of said resonator between opposite electrodes of an electrode pair. Said discharge producing means comprise means for switching a predetermined electric pulse across a predetermined one of said electrode pairs. Preferably, the electrode spacing defines the beam diameter, and the relative dimensions of the resonator produce single mode beam operation.

BRIEF DESCRIPTION OF THE DRAWING

A better understanding of the features of the preferred embodiment may be obtained from the accompanying detailed description used in conjunction with the drawing which shows a block diagram of a laser system of the present invention.

DESCRIPTION OF THE PREFERRED EMBODIMENT

Referring now to the drawing, there is shown a transverse electric field laser 10 comprising a folded optical resonator defined by mirrors 30, 32, 34 and 36. Mirrors 30 and 36 are the end mirrors that define the opposite extremes of the optical cavity, and mirrors 32 and 34 are used to fold or turn around a resonating beam in order to limit the length of the device. The mixture of a lasing gas is confined within the resonator structure by a folded laser envelope, not shown. For example, an appropriate mixture comprising carbon dioxide, nitrogen and helium, as is known in the art, may be used.

One set of main electrodes is placed between each region defined by one of the end mirrors and a turn-around mirror. Thus, electrodes 12 and 14 are placed between reflector 30 and 32 symmetrically about a center line of the folded laser and electrodes 16 and 18 are similarly placed between mirros 36 and 34 symmetrically about a corresponding center line. A preionizing flash board is also placed adjacent to each of the two regions thus defined. Each flashboard 21 and 23 comprises a support plate 20 and 22, respectively, and a plurality of auxiliary electrodes 24 disposed on a first surface of each support plate facing a respective main discharge region defined by the volume between a pair of main electrodes. The two preionizing flash boards are placed back-to-back and thus can share a common conductive member 26. The center auxiliary electrode of each flashboard is electrically coupled to the conductive member 26 which is electrically grounded. The two end auxiliary electrodes of each flashboard are electrically coupled to an output terminal of a respective pulse forming network. The operation of each flashboard is as follows. Upon application of a high voltage pulse between the two end auxiliary electrode and ground, a discharge will be produced between the end electrodes and their adjacent neighbors, resulting in a transfer of charge to these neighbors since the auxiliary electrode in combination with the backing plate and the conductive member form a plurality of spaced capacitors. The charge is then transferred by consecutive discharges from the two end electrodes to the grounded center electrode. The preionizing flashboards are located so that the chain of discharges between the auxiliary electrodes of each flash board 21 and 23 illuminates a respective main discharge region between a pair of two main electrodes. This is because the flash board converts a fraction of the stored energy into a pulse of ultraviolet radiation which in turn produces free electrons which when accelerated by an electric field promote uniform ionization of the gas in the interaction space between the main electrode. This is necessary to preclude the occurence of arcing, which would dump all the energy otherwise needed for pumping the gas mix.

The curvature and spacing of mirrors 30 and 36 and the size of the defining aperture determine the mode in which the optical resonator will oscillate. The fundamental or lowest order radially symmetric mode, ($TEM_{00}$ mode), is desired since it has the least beam divergence and no nodes or gaps in the far field. Mirrors 30 and 36 have a concave surface of similar radius of curvature to define a resonator having a mode volume with a waist in the center line of the folded resonator between the two turn-around mirrors. When the two sets of electrodes are placed symmetrically about the center, the mode volume contained between one pair of electrodes is the same as the other. This is important to make sure that both pulses are the same. Although the emitted beam might be slightly divergent, due to the curvature of the mirrors, this divergence may be compensated for by using an output mirror 36 with a curved rear surface, not shown in the figure, to effectively act as a lens. The aperturing is effected by making the mirrors slightly larger than the region between the main electrodes. An aperture is then placed somewhere in the resonator, typically at the output mirror. The diameter of the aperture is approximately equal to the electrode spacing. Using the main electrode spacing for defining the size of beam aperture insures optimum use of the gain medium, since most of the gas excited by the discharge is used to contribute to the formation of a laser pulse. Alternatively, aperturing may be effected by placing an aperture stop 33 between the two folding mirrors 32 and 34.

The operation of a laser system of the present invention is as follows. A timer 50 supplies a timing pulse at a predetermined repetition rate, for example 20 Hz. The timing pulses are used to trigger 50 to trigger pulse forming network 70 to supply a voltage to one of the flashboards, flashboard 21 for example, in order to preionize the laser medium, in this case in the region adjacent main electrodes 12 and 14, as described hereinabove. Preferably, the duration of the preionizing pulse is a few nanoseconds to 150 nanoseconds and has an amplitude of a few thousand volts. Trigger 60 is preferably formed by a spark gap having a trigger electrode connected to timer 50. The spark gap is used to electrically connect suitable energy storage capacitors, which are part of pulse forming network 70, across the required points on the auxiliary electrodes. The energy storage capacitors in pulse forming network 70 are charged to their required level by high power voltage supply 80. A main laser discharge pulse is applied by pulse forming network 70 to main electrodes 12 and 14 approximately after the cessation of the preionizing discharge between the auxiliary electrodes of the flashboard.

The same timing pulses applied to trigger 60 are also applied by timer 50 to delay 90. Delay 90 is used to provide a suitably delayed timing pulse to trigger 100, which in turn is used to trigger pulse forming network 110 to supply a voltage pulse to the second flashboard, flashboard 23 for example, to preionize the laser medium adjacent main electrodes 16 and 18. At the end of this preionizing pulse, pulse forming network 110 also applies to a main discharge pulse across the second set of main electrodes 16 and 18. Thus, the system just described produces a first laser pulse at time $t_0$ defined by each timing pulse from timer 50 and a second laser pulse at a subsequent time $t_1$ determined by the amount of delay selected in delay 90.

It should be understood that even though a specific implementation for a preionizing flashboard has been described to produce a preionization pulse to uniformly ionize the gas mix, other methods of producing the required level of ionization for proper operation of the laser may be used.

It should be appreciated that since there are provided two separate discharge regions that can be fired off independently, the laser system can be used to generate a larger laser pulse by setting the delay in delay 90 to zero, thus causing simultaneous discharges in the two sets of electrodes. Alternatively, any amount of delay may be set by delay 90 to generate two discharges that are separated in time by any predetermined amount less than the timing pulse repetition rate.

In general, each time that a discharge takes place, a portion of the gas mixture in the discharge breaks down and decomposes into different compounds. In the case where $CO_2$ is used as the active species, the breakdown produces $CO$ and $O_2$. Under normal conditions, the disassociated components will recombine, and catalysts may be used to aid the recombination process. However, a problem occurs in applications requiring multiple pulses separated by a time duration shorter than the recombination time. The disassociated gas causes a smaller amount of active molecules to be available in the discharge region, and thus it provides less gain, possibly less than the minimum required, for the generation of a laser pulse. In addition to producing a decomposition of the gain medium, each discharge produces a shock wave which heats the medium in the vicinity of the discharge. The rise in temperature reduces the gain of the medium further, thus precluding the successive generation of substantially identical laser pulses if each discharge takes place before the heat dissipates. An important advantage of the laser system of the present invention is that these problems are eliminated by providing multiple discharge regions separated from each other and effectively having independent gas volumes, thus enabling the firing of successive discharges in different regions, each utilizing a substantially stable active volume of the gain medium. It should also be appreciated that since the two discharges are separated and are isolated from each other the shock wave from one discharge should not significantly disturb the other discharge.

It has been found that if a delay time of approximately 100 microseconds is used, there is no measurable interference in the two laser pulses thus generated. This is because the shock wave has been sufficiently dissipated within that period of time. Smaller intervals may be achieved by placing around the discharge regions materials that absorb the shock wave and prevent it from bouncing off the walls of the envelope and return to disturb the optical cavity.

An advantage of the present laser system is that since the two discharge regions are within the same optical resonator pulsing either one of them produces substantially identical output pulses. Additionally, the overall mirror separation in the electrode spacing define a Fresnel number which is almost ideal for single transverse mode operation. The Fresnel number is proportional to the radius square of the beam divided by the operating wavelength times the length of the optical resonator. A Fresnel number approximately equal to 2 is found to easily satisfy the single transverse mode requirements. The folded design makes possible the building of such a resonator in a very compact structure. This may be achieved by having a main electrode separation of 0.85 centimeters and having a single discharge region length of 25 centimeters for an operating wavelength of 10.6 microns for a $CO_2$ TEA laser.

It is understood that the above described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. In combination:
an optical resonator;
a gain medium disposed in said resonator;
a plurality of discharge regions disposed in said gain medium; and
means for producing a first discharge pulse in a first one of said regions in response to a first control pulse and for producing a second, time delayed, discharge pulse in a second one of said regions in response to a second, time delayed, control pulse, and
wherein said optical resonator includes means, responsive to the first and time delayed second discharge pulse, for generating correspondingly time delayed pulses of resonant optical energy in the resonator, such time delayed resonant optical energy pulses being coupled along a common path to an output of the resonator.

2. In combination:
an optical resonator;
a gain medium disposed in said resonator;
a plurality of discharge regions disposed in said gain medium; and
means for producing a first discharge pulse in a first one of said regions in response to a first control pulse and for producing a second, time delayed, discharge pulse in a second one of said regions in response to a second, time delayed, control pulse, and
wherein said optical resonator includes means, responsive to the first and time delayed second discharge pulses, for generating correspondingly time delayed pulses of resonant optical energy in the resonator, such time delayed resonant optical energy pulses being directed along a common path to an output of the resonator, said path passing through the gain medium and the plurality of discharge regions.

3. The combination of claim 2 wherein:
the first discharge pulse produced in the first discharge region in response to the first control pulse generates a turbulence in the optical resonator and wherein the time delay of the second control pulse is greater than the duration of turbulence generated in the resonator by the first discharge pulse in the first discharge region.

4. The combination of claim 2 wherein:
the time delay of the second control pulse is greater than 100 microseconds.

5. A laser system comprising in combination:
a plurality of discharge regions having a gain medium disposed therein;
means for producing time delayed discharge pulses in said discharge regions; and
an optical resonator having said plurality of discharge regions disposed therein, said optical resonator comprising: means for generating, in response to said time delayed discharge pulses, correspondingly time delayed pulses of resonant optical energy in the resonator; and, means for directing said time delayed pulses of resonant optical energy along a common path to an output of the resonator, a portion of said path passing through the gain medium in each of the plurality of discharge regions.

6. The combination of claim 5 wherein:
each of said discharge regions comprises a different predetermined portion of said resonator.

7. The combination of claim 5 wherein:
the laser system comprises a plurality of pairs of opposing electrodes and wherein each one of said plurality of discharge regions is associated with one of the plurality of pairs of opposing electrodes, each pair of electrodes having disposed therebetween the gain medium in the discharge region associated therewith and each pair of electrodes having surfaces disposed transversely to the portion of the path passing through the discharge region associated with such pair of electrodes.

8. The combination of claim 7 wherein:
said discharge pulse producing means comprises means for switching an electric pulse across plurality of discharge regions.

9. The combination of claim 8 wherein:
said pulses of resonant optical energy form optical beams having a predetermined diameter, and wherein the opposing electrodes are spaced a predetermined distance, said distance defining the diameter of the optical beams.

10. The combination of claim 9 wherein:
said optical resonator has a predetermined length, and wherein the distance between the pair of opposing electrodes and the length of the resonator are selected to provide for single transverse mode operation.

11. The combination of claim 5 wherein:
said common path is folded about a fold region and wherein said fold region is disposed between a first one of said plurality of discharge regions and a second one of said plurality of discharge regions.

12. In combination:

an optical resonator;

a gain medium disposed within the resonator;

a plurality of discharge regions disposed within said optical resonator, said discharge regions having corresponding portions of the gain medium disposed therein; and pulse forming means for producing a first discharge pulse in a first one of said discharge regions and for producing a second, time delayed, discharge pulse in a second one of said discharge regions, and wherein said optical resonator includes means, responsive to the first and time delayed second discharge pulses, for generating correspondingly time delayed pulses of resonant optical energy in the resonator, such time delayed resonant optical energy pulses being directed along a common path to an output of the resonator, said path passing through the portions of the gain medium disposed within the plurality of discharge regions.

13. The combination of claim 12 wherein:

said common path is folded about a fold region and wherein said fold region is disposed between the first one of said plurality of discharge regions and the second one of said plurality of discharge regions.

14. The combination of claim 12 wherein:

the optical resonator further comprises a plurality of pairs of opposing, spaced electrodes coupled to said pulse forming means and wherein each one of said plurality of discharge regions is associated with one of the plurality of pairs of opposing, spaced electrodes, each pair of electrodes having a portion of the gain medium disposed therebetween and each pair of electrodes having surfaces disposed transversely to the portion of the path for the time delayed pulses of resonant optical energy passing through said gain medium.

15. The combination of claim 14 wherein: said time delayed pulses of resonant optical energy form optical beams, and further comprising means for aperturing said optical beams to a size approximately equal to the spacing between the pair of opposing electrodes associated with each one of said plurality of discharge regions.

16. The combination of claim 15 wherein:

said optical resonator has a predetermined length, said length being selected to provide for single transverse mode operation.

17. The combination of claim 12 further comprising:

means for preionizing the gain medium in a selected one of said plurality of discharge regions prior to the discharge pulse in the selected region.

18. The combination of claim 13 further comprising:

means for preionizing the gain medium in the first discharge region prior to the discharge pulse in said first region and for preionizing, after a preionization time delay, the gain medium in the second discharge region prior to the discharge pulse in said second region, said preionization time delay corresponding to the time delay between the discharge pulse in the first region and the discharge pulse in the second region; and wherein turbulence is produced in the resonator with each discharge pulse and wherein said preionizing means is disposed adjacent the first discharge region and the second discharge region to inhibit turbulence associated with one of such discharge pulses from entering the discharge region wherein the other one of the discharge pulses is produced.

* * * * *

UNITED STATES PATENT OFFICE
CERTIFICATE OF CORRECTION

Patent No. 4,507,788          Dated March 26, 1985

Inventor(s) James W. Barnie and Robert I. Rudko

It is certified that error appears in the above-identified patent and that said Letters Patent are hereby corrected as shown below:

In the Specification:

Column 3, Line 58:    Change "to", first occurrence to -- by --.

Column 3, Line 58:    Change "50" to --60--.

Column 3, Line 59:    After the word "a" insert --pulse of--.

Column 4, Line 18:    Delete the word "to".

Column 6, Line 49:    After "across" insert --the pair of electrodes associated with a predetermined one of said--.

Signed and Sealed this

Twelfth Day of November 1985

[SEAL]

Attest:

DONALD J. QUIGG

Attesting Officer      Commissioner of Patents and Trademarks